United States Patent [19]

Ekas, Sr. et al.

[11] Patent Number: 4,741,148
[45] Date of Patent: May 3, 1988

[54] TRACTOR ATTACHED LEAF OR CLIPPING BLOWER/VACUUM DEVICE

[76] Inventors: Frank E. Ekas, Sr.; Frank E. Ekas, Jr., both of 851 Ekastown Rd., Sarver, Pa. 16055

[21] Appl. No.: 751,578

[22] Filed: Jul. 3, 1985

[51] Int. Cl.$^4$ .......................................... A01D 35/262
[52] U.S. Cl. ..................... 56/12.9; 56/13.4
[58] Field of Search ................. 56/12.8–12.9, 56/13.1–13.4, 14.9, 320.1–320.2, DIG. 8, DIG. 14, DIG. 17

[56] References Cited

U.S. PATENT DOCUMENTS

| | | | |
|---|---|---|---|
| Re. 29,139 | 2/1977 | Messner | 56/13.1 |
| Re. 31,930 | 7/1985 | Luick | 56/12.9 |
| 2,706,372 | 4/1955 | Blydenburgh | 56/25.4 |
| 2,807,126 | 9/1957 | Bennett | 56/25.4 |
| 2,957,295 | 10/1960 | Brown | 56/25.4 |
| 3,367,091 | 2/1968 | Weiland | 56/25.4 |
| 3,541,771 | 11/1970 | Schulze | 56/320.2 |
| 3,680,295 | 8/1972 | Rutherford | 56/320.2 |
| 3,705,484 | 12/1972 | Hjelmquist | 56/320.2 |
| 3,706,189 | 12/1972 | Rutherford | 56/13.4 |
| 4,121,405 | 10/1978 | Wolf | 56/12.9 |
| 4,129,977 | 12/1978 | Comer | 56/320.2 X |
| 4,205,510 | 6/1980 | Raniero | 56/12.9 |
| 4,257,214 | 3/1981 | Ferguson et al. | 56/320.2 X |
| 4,307,563 | 12/1981 | Fuelling, Jr. et al. | 56/320.2 |
| 4,322,940 | 4/1982 | White | 56/DIG. 8 X |
| 4,328,661 | 5/1982 | Ferguson | 56/320.2 X |
| 4,411,125 | 10/1983 | Strickland | 56/13.4 X |
| 4,411,125 | 10/1983 | Strickland | 56/16.9 |
| 4,452,034 | 6/1984 | Neuerburg | 56/320.1 |

Primary Examiner—William E. Kamm
Assistant Examiner—Angela D. Sykes
Attorney, Agent, or Firm—Fleit, Jacobson, Cohn & Price

[57] ABSTRACT

A downwardly opening generally circular plan-shaped horizontal housing is provided including opposite side maximum width portions and having a driven rotary vacuum blade assembly journalled therein about a central upstanding axis. The lower end of the downwardly opening housing is at least substantially closed throughout an annular zone extending about and inwardly from the outer periphery of the housing lower end and a depending skirt structure is provided establishing a substantial barrier to the longitudinal flow of reduced pressure air inward toward the center of the annular zone immediately beneath the latter from all horizontal directions, except those horizontal directions extending inwardly toward the center of said annular zone from said opposite side maximum width marginal portions. In addition, the blade assembly includes generally radially outwardly projecting paddle-like blades paralleling radial planes of the axis of rotation of said blade assembly and the forward sides of the blades include midheight longitudinally extending and forwardly projecting ribs operative to deflect air upon which the blades are advanced and to impact with, cut and shear lawn debris against which the ribs impact.

13 Claims, 2 Drawing Sheets

TRACTOR ATTACHED LEAF OR CLIPPING BLOWER/VACUUM DEVICE

BACKGROUND OF THE INVENTION

1. Field of the Invention

This invention relates to a vacuum apparatus including a downwardly opening housing of generally circular plan shape and having a bladed rotor journalled therein. The lower end of the housing is partially closed by an annular lower end wall disposed below the rotor and the housing includes depending skirt portions supported from the housing and extending thereabout. The skirt portions including a forward transverse wall generally tangential to the forward inner periphery of the annular lower end wall, opposite side front-to-rear extending walls substantially tangential to the opposite side of the housing and rearwardly convergent rear walls extending from the rear ends of the sidewalls to the rear proportion of the inner periphery of the annular lower end wall. The annular lower end wall serves to concentrate the debris lifting force of the vacuum in the central area of the swath covered by the housing during its forward movement and the skirt shield serves to generate strong opposite side lateral inward air currents to thereby effectively remove even heavy lawn debris throughout the entire width of the swath covered by the housing and not merely the central portion of the swath of the housing defined by the inner periphery of the lower end wall.

2. Description of Related Art

Various different forms of lawn vacuum devices and other similar structures have been provided heretofore such as those disclosed in U.S. Pat. Nos. 2,706,372, 2,807,126, 2,957,295, 3,367,091, 3,680,295, 3,706,189, 4,121,405, 4,205,510 and 4,411,215. However, these previously known forms of vacuum devices have not been specifically designed to provide maximum debris removing air flow throughout the entire width of the swaths covered thereby.

SUMMARY OF THE INVENTION

The vacuum apparatus of the instant invention has been specifically designed to provide a structure by which lawn debris may be most effectively removed from a lawn or other ground area by a reasonably simple vertical axis blower rotor.

The main object of this invention is to provide a rotary vacuum device which will be capable of vacuum removal of lawn debris throughout a reasonably wide swath traversed by the vacuum apparatus.

Another object of this invention is to provide a vacuum lawn debris apparatus which will be capable of generating high vacuum forces along a central portion of the associated swath and strong horizontal inward air currents along the opposite side marginal portions of the corresponding swath.

Yet another object of this invention is to provide a lawn debris vacuum device constructed in a manner whereby it may be self-propelled or supported from the 3 point hitch of a lawn tractor with the rotor portion of the vacuum device driven from the power take off of the lawn tractor.

A final object of this invention to be specifically enumerated herein is to provide a lawn debris vacuum device in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
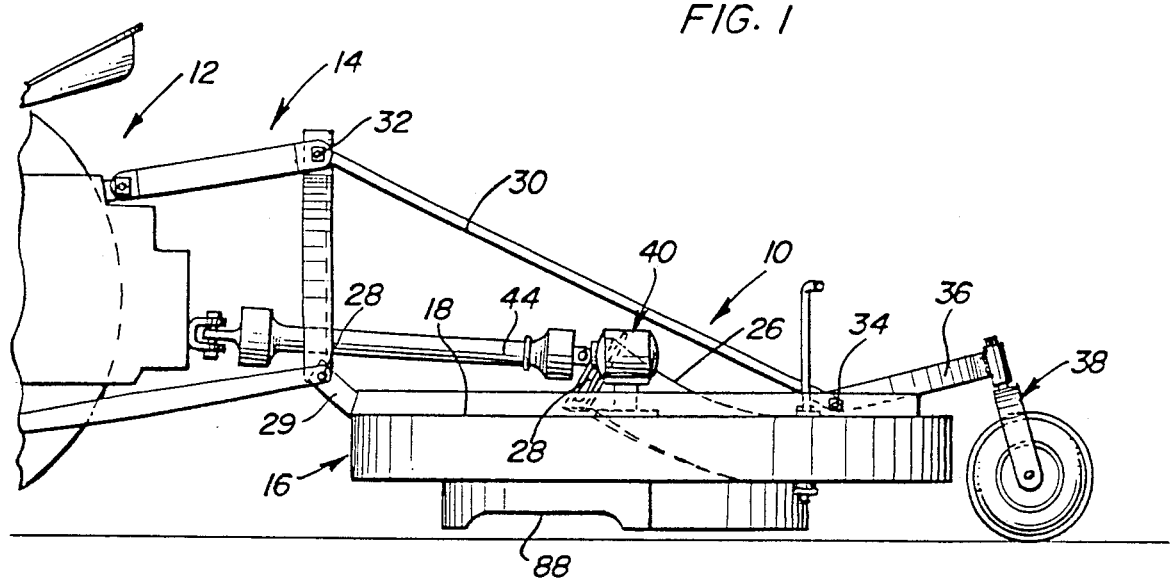
FIG. 1 is a side elevational view of the lawn debris vacuum device.

Referring now more specifically to the drawings, the numeral 10 generally designates a lawn vacuum device constructed in accordance with the present device. The device 10 is illustrated in operative association with and supported and driven from a tractor referred to in general by the reference numeral 12 and including a 3 point hitch referred to in general by the reference numeral 14.

The vacuum device 10 includes a downwardly opening housing 16 of substantially circular plan shape and including a generally circular top wall 18 and a generally cylindrical peripheral wall 20 depending downwardly from the outer marginal portion of the top wall 18. The rear portion of the housing 16, however, including a generally tangential lateral exhaust chute 22 from which lawn debris picked up by the vacuum 10 is discharged. The outer end 24 of the exhaust chute 22 is provided with a Y-shaped outlet fitting 26 by which the debris discharge from the chute 22 may be alternately ducted to the ambient air at 27 or to a collection bag outlet 28, the control of which fitting 26 is by a pivoted gate 29.

The housing 16 includes forward opposite side mounting arms 29 by which the forward end of the housing 16 may be pivotally connected as at 28 to the rear lower arms of the hitch 14 and the vacuum 10 further includes a forwardly and upwardly inclined braces 30 whose forward ends are pivotally connected as at 32 to the upper arm of the hitch 14, the lower rear ends of the braces being anchored to the housing 16 as at 34. In addition, the housing 16 includes a short rearwardly and upwardly inclined support arm 36 rigidly mounted thereon from whose rear upper end a caster wheel assembly referred to in general by the reference numeral 38 is oscillatably supported.

The center of the top wall 18 mounts a right angle drive assembly referred to in general by the reference numeral 40 and including a forwardly projecting input shaft 42 to which the rear end of a power take off drive shaft 44 is operably connected, the forward end of the drive shaft 44 being universally coupled to the power output shaft 46 of the tractor 12.

The right angle drive assembly 40 includes a vertical depending power output shaft 48 projecting downwardly and rotatably received through the top wall 18 and the lower end of the shaft 48 has a mounting disc 50 mounted thereon.

The mounting disc 50 comprises the central hub of a bladed rotor assembly referred to in general by the reference numeral 52 and disposed within the housing 16. The rotor assembly 52 includes four generally radial blades 54 and each blade 54 includes a generally paddle-like generally planar blade portion 56 which substantially parallels a corresponding radial plane of the axis of rotation of the shaft 48. The blade portions 56 includes inner end portions provided with inwardly convergent upper and lower marginal edges 58 and 60 and each blade portion 56 includes a mid-height longitudinally extending horizontal rib 62 secured to and projecting laterally outwardly from the front side of the corresponding blade portion 56. The ribs 62 extend radially inwardly of the rotor 52 beyond the inner terminal ends of the blade portions 56 and are anchored to the underside of the disc or hub 50 by suitable fasteners 64.

Figure 2:
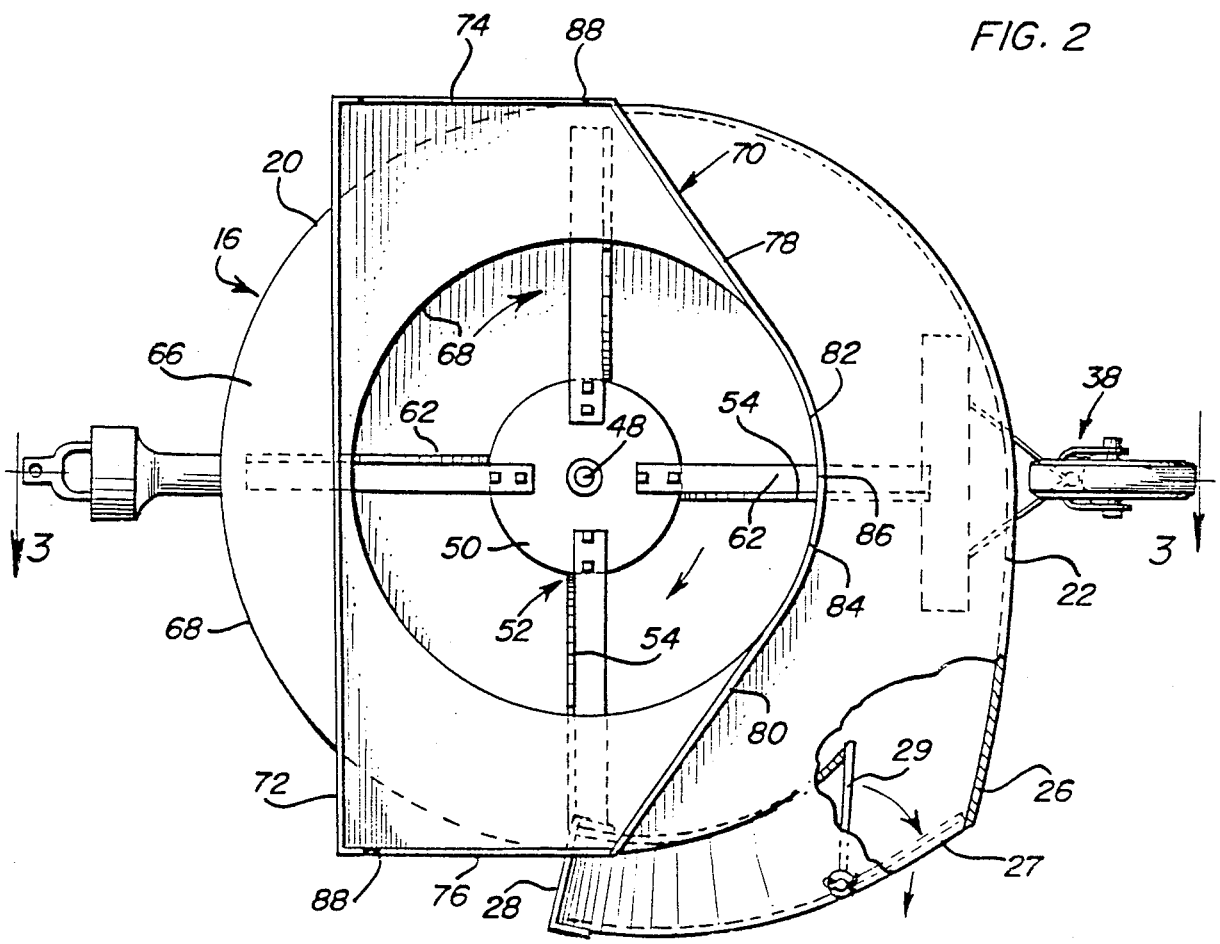
FIG. 2 is a bottom plan view of the lawn debris vacuum device.
Figure 3:
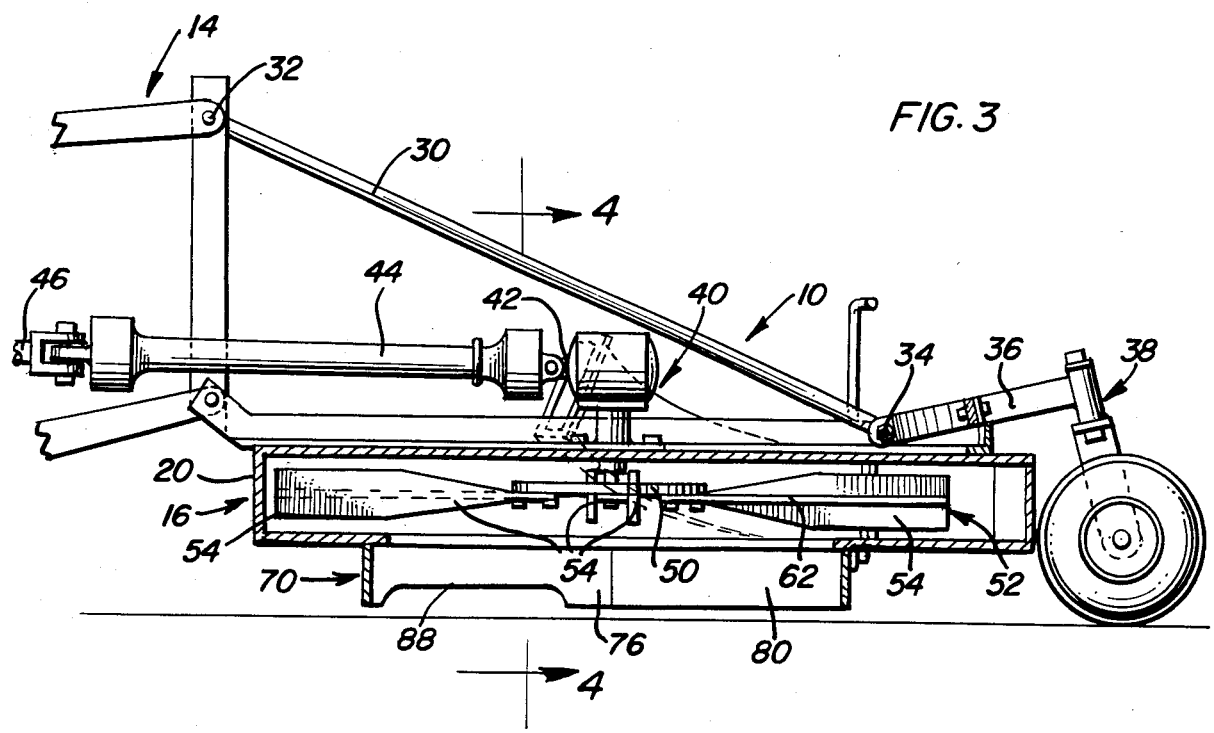
FIG. 3 is an enlarged longitudinal vertical sectional view of the lawn debris vacuum device taken substantially upon a plane passing through the longitudinal center line of the vacuum device.
Figure 4:
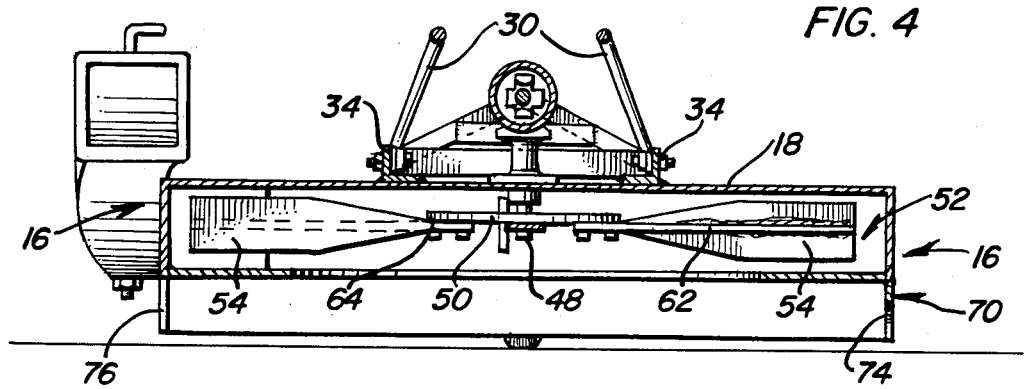
FIG. 4 is a transverse vertical sectional view taken substantially upon the plane indicted by the section line 4—4 of FIG. 3.
Figure 5:
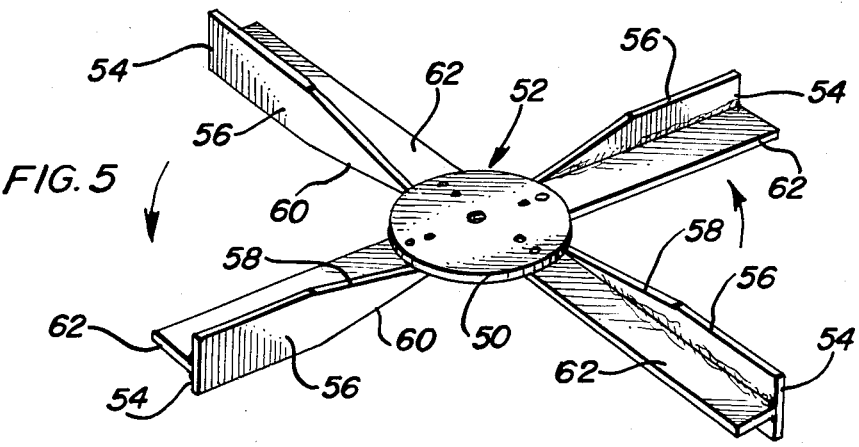
FIG. 5 is a perspective view of the rotor of the vacuum device.

With attention invited now more specifically to FIGS. 2 and 4 of the drawings, it may be seen that the housing 16 includes an annular lower end wall 66 whose outer periphery 68 is supported from the lower periphery of the peripheral wall 20 and whose inner periphery 68 is spaced slightly more than one-third the radius of the housing 16 inward from the peripheral wall 20 thereof. The rotor 52 is vertically centered between the top wall 18 and the annular lower end wall 66 and, accordingly, the vacuum generated by rotation of the rotor 52 at high speed within the housing 16 is concentrated across the inner periphery 68 of the lower end wall 66.

However, the vacuum 10 includes a depending skirt shield referred to in general by the reference numeral 70 and including a forward depending transverse wall 72, depending front to rear extending opposite sidewalls 74 and 76 and rearwardly convergent opposite side rear walls 78 and 80.

The front wall 72 is disposed generally tangential to the forward extremity of the inner periphery 68, although the front wall 72 may be spaced slightly forward of the inner periphery 68, and the opposite sidewalls 74 and 76 are disposed generally tangential to the opposite side outer portions of the housing 16. The opposite side rear walls 78 and 80 converge rearwardly from the rear ends of the sidewalls 74 and 76 and include inwardly curving rear end portions 82 and 84 joined together as at 86 and substantially coextensive with the rear portion of the inner periphery 68 of the lower end wall 66. In addition, each of the sidewalls 74 and 76 includes a downwardly opening notch 88 formed therein.

The lower end wall 66, skirt 70 and notches 88 coact to provide a vacuum capable of performing a more complete vacuuming operation throughout the entire width of a swath along which vacuum 10 moves. If the lower end of the housing 16 was fully open with the lower end wall 66 and skirt 70 omitted, maximum vacuum would be created in approximately the area of the underside of the housing 16 occupied by the lower end wall 66. This would be true in view of the fact that the outer ends of the blades 56 travel at considerably greater linear speed than the inner ends of the blades 56. Thus, substantially all vacuum pick up of lawn debris would be carried out beneath those area of the housing 16 immediately inward of the side or peripheral wall 68.

In order to increase the velocity of the reduced pressure air being drawn upwardly into the lower portion of the housing 16, the lower end wall 66 is provided whereby all of the vacuum air must pass through the central opening of the lower end wall 66 bound by the inner periphery 68. Inasmuch as this opening is smaller (but not excessively restricted) in area than the total plan area of the housing 16, the vacuum air entering the opening bound by the inner periphery 68 moves at considerably greater velocity. However, if the skirt 70 were not provided, the lawn vacuuming operation carried out by the vacuum 10 would occur substantially along a narrow swath with which the opening defined by the inner periphery 68 is registered. This, of course, would greatly reduce the lawn area that could be vacuumed by the vacuum 10 in a given period of time.

In order to increase the effective vacuuming swath width of the vacuum 10, the skirt 70 is provided and the lower ends of the walls 72, 74, 76 and 78 closely overlie the ground over which the vacuum 10 passes, except for those portions of the sidewalls 74 and 76 having the notches 88 formed therein. The notches 88 provide large cross-sectional area openings through which ambient air may be drawn into the area beneath the housing 16 from opposite sides thereof. Thus, during operation of the vacuum 10, very high velocity airflow moves inwardly beneath the opposite sides of the housing 16 through the notches 88 and blows whatever lawn debris is lying upon the ground between the opposite side portions of the inner periphery 18 and the opposite sidewalls 74 and 76 of the skirt 70 inwardly toward the central portion of the swath along which the vacuum 10 passes registered with the opening defined by the inner periphery 68. Accordingly, although the greater vacuum created by the utilization of the lower end wall 66 is limited to the central portion of the swath along which the vacuum 10 moves, the notches 88 enable a majority of the ambient air moving inwardly beneath the housing 18 to pass inwardly from the outer sides of the sidewalls 74 and 76 toward the inner periphery 68 along predetermined transversely inwardly directed paths and this majority of ambient airflow is at such a velocity to insure that substantially all lawn debris along the opposite side marginal portions of the swath along which the vacuum 10 is moving is blown toward the central area of the swath with which the opening defined by the inner periphery 68 is registered.

The ribs 62 are not only utilized to mount the blades 56 from the disc or hub 50, but also to cut or shear larger pieces of lawn debris against which the blades 56 are advanced. In addition, the ribs 62 comprise inherent bracing for the blades 56.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vacuum for vacuuming lawn debris and the like, said vacuum including a downwardly opening housing of generally circular plan shape, defining opposite side maximum width portions and incorporating one peripheral portion defining a generally tangentially exhaust chute opening outwardly from said housing, the lower portion of said housing being partially closed by an annular air flow shielding lower end wall having an inner periphery including a rear extremity and an outer periphery, said outer periphery being supported from the outer periphery of said housing, a depending skirt shield supported from said housing, said shield including a generally transverse depending front wall portion having opposite ends, depending opposite sidewall portions having front and rear ends and extending rearwardly from the opposite ends of said front portion and substantially tangential to the opposite side maximum width portions of said housing and rearwardly convergent depending opposite side rear wall portions extending rearwardly and inwardly from the rear ends of said sidewall portions and joined at their rear ends, the rear ends of said opposite side rear wall portions being joined at a point generally registered with the rear extremity of the inner periphery of said annular lower end wall, and a rotary blade assembly journalled within said housing above said lower end wall for rotation about an axis generally coaxial with said annular lower end wall, said blade assembly including generally radial blade members whose outermost ends are spaced inward of the internal surfaces of said housing and outward of the inner periphery of said lower end wall.

2. The vacuum of claim 1 wherein said housing includes front and rear ends, 3 point hitch connection means carried by said front end for connection with and support from the 3 point hitch of a tractor.

3. The vacuum of claim 2 wherein the rear end of said housing includes a rearwardly offset caster wheel assembly.

4. The vacuum of claim 1 wherein said blade members each include paddle-like generally planar blades substantially paralleling radial planes of said axis.

5. The vacuum of claim 4 wherein said blades include radial innermost ends which taper in height toward said axis.

6. The vacuum of claim 5 wherein said blades include elongated longitudinally extending debris and air deflecting ribs extending therealong and spaced generally equally between the upper and lower marginal edges of said blades, said ribs projecting laterally outwardly of those sides of said paddle-like blades facing in the direction of intended rotation of said blade assembly.

7. The vacuum of claim 6 wherein said ribs each project laterally of the corresponding blade a distance substantially equal to the vertical height of said blades.

8. The vacuum of claim 6 wherein said rotary blade assembly includes a central mounting disc portion, said disc including a medial plane, said ribs generally paralleling the medial plane of said disc and including inner end portions thereof projecting inwardly of the corresponding innermost ends of said blades, the inner end portions of said ribs being disposed in overlapped engagement with said disc and removably anchored thereto.

9. The vacuum of claim 1 wherein said housing includes front and rear ends, 3 point hitch connection means carried by said front end for connection with a support from the 3 point hitch of a tractor, the rear of said housing including a rearwardly offset caster wheel assembly, said exhaust chute being disposed tangential to the rear end of said housing.

10. The vacuum of claim 1 wherein the rear ends of said rear wall portions curve smoothly inward and are coextensive with the rear extremity of the inner periphery of said lower end wall.

11. The vacuum of claim 10 wherein said opposite sidewall portions include downwardly opening notches formed therein defining ambient air openings for the entrance of ambient air laterally inwardly of the maximum width portions of said housing.

12. A vacuum for vacuuming lawn debris and the like, said vacuum including a downwardly opening housing of generally circular plan shape, defining opposite side maximum width portions, including a lower portion and incorporating one peripheral portion defining a generally tangentially exhaust chute opening outwardly from said housing, the lower portion of said housing being partially closed by an annular air flow shielding lower end wall having an outer periphery and an inner periphery including front and rear extremities, said outer periphery being supported from the outer periphery of said housing, a rotary blade assembly journalled within said housing above said lower end wall for rotation about an axis generally coaxial with said annular lower end wall, a depending skirt shield supported from said housing, said shield including a generally transverse depending front wall portion, having opposite ends, a transverse depending rear wall structure whose central portion is generally registered with the rear extremity of the inner periphery of said lower end wall and including opposite ends, and depending opposite sidewall portions having front and rear ends and extending between corresponding opposite ends of said front wall portion and rear wall structure, said transverse front wall portion including a mid-length portion generally registered with the front extremity of said inner periphery of said lower end wall, said opposite sidewall portions extending along front to rear upstanding planes at least generally tangential to said opposite side maximum width portions of said housing, said shield defining a downwardly opening and transversely extending elongated airflow channel including front and rear boundaries closely adjacent the front and rear extremities of the inner periphery of said annular lower end wall and a longitudinal mid-portion registered with the area bound by said inner periphery.

13. The vacuum of claim 12 wherein said exhaust chute includes selectively usable ambient air and debris collection bag outlets.

* * * * *